United States Patent
Ekladyous et al.

(10) Patent No.: US 8,928,869 B2
(45) Date of Patent: Jan. 6, 2015

(54) DYNAMIC HEADLAMP AIM BUY-OFF WINDOW

(75) Inventors: Albert Ekladyous, Shelby Twp., MI (US); John W. Wilds, Trenton, MI (US); Arun Kumar, Farmington Hills, MI (US); Venkatesan Balaraman, Troy, MI (US); Sleiman N. Abdelnour, Macomb, MI (US); Mahendra S. Dassanayake, Bloomfield Hills, MI (US); Candace C. Glasgow, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 691 days.

(21) Appl. No.: 13/269,657

(22) Filed: Oct. 10, 2011

(65) Prior Publication Data
US 2013/0088711 A1 Apr. 11, 2013

(51) Int. Cl.
*G01J 1/00* (2006.01)
*G01M 11/06* (2006.01)

(52) U.S. Cl.
CPC .................... *G01M 11/064* (2013.01)
USPC ............................................... 356/121

(58) Field of Classification Search
CPC ........... G02B 19/0028; G02B 19/0076; G02B 5/0215; G02B 5/0221; G02B 5/0278; G02B 5/021; G02B 5/0242; G02B 5/08; G01B 11/27; G01B 11/2755; G01B 21/22; G01B 21/24; G01B 2210/14; G01B 2210/283
See application file for complete search history.

(56) References Cited

U.S. PATENT DOCUMENTS

| | | | | |
|---|---|---|---|---|
| 2,977,843 A * | 4/1961 | Graeber et al. | ................ | 250/204 |
| 3,841,759 A * | 10/1974 | Turner | ................ | 356/121 |
| 3,898,742 A * | 8/1975 | Hunnicutt | ................ | 33/288 |
| 4,730,923 A | 3/1988 | Kosugi | | |
| 4,948,249 A | 8/1990 | Hopkins | | |
| 5,321,439 A | 6/1994 | Rogers | | |
| 5,331,393 A * | 7/1994 | Hopkins et al. | ................ | 356/121 |
| 7,876,427 B1* | 1/2011 | Melvin | ................ | 356/121 |
| 8,004,663 B1* | 8/2011 | Melvin | ................ | 356/121 |
| 8,125,628 B1* | 2/2012 | Lones | ................ | 356/121 |
| 8,605,269 B2* | 12/2013 | Yotz et al. | ................ | 356/121 |
| 2013/0058111 A1* | 3/2013 | Ekladyous et al. | ................ | 362/460 |

FOREIGN PATENT DOCUMENTS

JP 59147237 A 8/1984

OTHER PUBLICATIONS

Vision 1 Instruction Manual, Hopkins Manufacturing Corporation 1993, pp. 1-49.
American Aimers, Vision 100—Optical Headlamp Aimer Instructional Manual, Hopkins Manufacturing Corporation, 1999, pp. 1-20.

* cited by examiner

*Primary Examiner* — Michael P Stafira
(74) *Attorney, Agent, or Firm* — Raymond L. Coppiellie; MacMillan, Sobanski & Todd, LLC

(57) ABSTRACT

A method for aiming headlamps on a vehicle achieves a reduced variation in beam heights without making any changes to existing test equipment. A cutoff height of a first headlamp is measured. The first headlamp is adjusted until a first measured cutoff height is within a predetermined range centered on a predetermined fixed height. A cutoff height of a second headlamp is measured. The second headlamp is adjusted until a second measured cutoff height is within the predetermined range centered on the first measured cutoff height.

6 Claims, 4 Drawing Sheets

DYNAMIC HEADLAMP AIM BUY-OFF WINDOW

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to motor vehicle headlamp systems, and, more specifically, to method and apparatus for aiming headlamps.

Motor vehicles use headlamps to illuminate the road. One or two pairs of headlamps are typically mounted at the left and right front sides of the vehicle. For example, a pair of low-beam headlamps and a pair of high-beam headlamps are used on some vehicles. Other vehicles may employ a single pair of headlamps that are electrically controlled to provide either low-beam or high-beam illumination.

Various regulations specify the light patterns that are to be produced by the headlamps. In particular, a beam cutoff (i.e., an upper border between illumination falling above and below a particular intensity) must be located at a certain height above the ground at a specified distance in front of the vehicle. In order to ensure compliance with regulations, headlamp mountings are made adjustable in order to aim the light beams as required. In general, a vehicle under test is positioned in a certain position relative to a test surface or measuring device, the headlamps are illuminated, and the resulting light pattern is analyzed. Based on the analysis, the headlamp mounting is adjusted either manually or automatically to obtain the desired position of the light beam. Headlamp aiming equipment (i.e., aimers) are available which employ either projection analysis or direct measurement of the beam cutoff. Robotic mechanisms may be used for performing automatic adjustments.

Headlamps must be properly aimed at the manufacturing plant during assembly of the vehicle. Vehicle manufacturers have found that improper aiming of headlamps may be observable to car buyers even when the aiming of the beams meets regulatory requirements. Regulations typically allow beam cutoffs to fall within a specified range of heights. Differences in aiming between a right-side headlamp and a left-side headlamp within the allowed range may be a source of dissatisfaction to the vehicle customer.

The criteria used in the aiming process includes a "buy-off window" for defining the acceptable values for a cutoff height. An aimer measures the current cutoff height of a headlamp and compares it to the buy-off window. If outside the window, an adjustment is made (either manually or automatically) and the height is re-measured. Once the measured cutoff falls within the buy-off window, the headlamp is disconnected from the aimer and the other headlamp of the pair can be checked. The term "aimer" typically refers to a device that measures a cutoff height. The aimer or a separate peripheral computing device determines any difference between the measured height and a pre-programmed desired height. For manual adjustment, the aimer may visually display the height discrepancy or the correction to be made. For automatic adjustment, an electronic message containing the correction is sent by the aimer or computing device to a robotic adjuster.

The vertical size for the cutoff window is selected to ensure that the cutoff is within regulations. Conventionally, the buy-off window is of a fixed size and a fixed distance from the ground. A window size small enough to ensure regulatory compliance may be large enough to allow a noticeable difference between cutoffs to remain present. Reducing the window size can lower any remaining differences between the sides. However, a smaller window size requires more expensive equipment both for measuring the height (e.g., the aimer) and for adjusting the headlamp mount (e.g., robotics) because of the more precise tolerances required. For example, more precise optics must be used and a smaller adjustment increment must be supported by the adjuster. In addition, aiming would take longer to complete which is particularly undesirable in a vehicle assembly line process.

SUMMARY OF THE INVENTION

The present invention reduces differences between left/right headlamp cutoff heights by using a dynamically-located buy-off window for the aiming of the second headlamp of a pair of headlamps being aimed.

In one aspect of the invention, a method is provided for aiming headlamps on a vehicle. A cutoff height of a first headlamp is measured. The first headlamp is adjusted until a first measured cutoff height is within a predetermined range centered on a predetermined fixed height. A cutoff height of a second headlamp is measured. The second headlamp is adjusted until a second measured cutoff height is within the predetermined range centered on the first measured cutoff height.

DETAILED DESCRIPTION OF PREFERRED EMBODIMENTS

Figure 1:
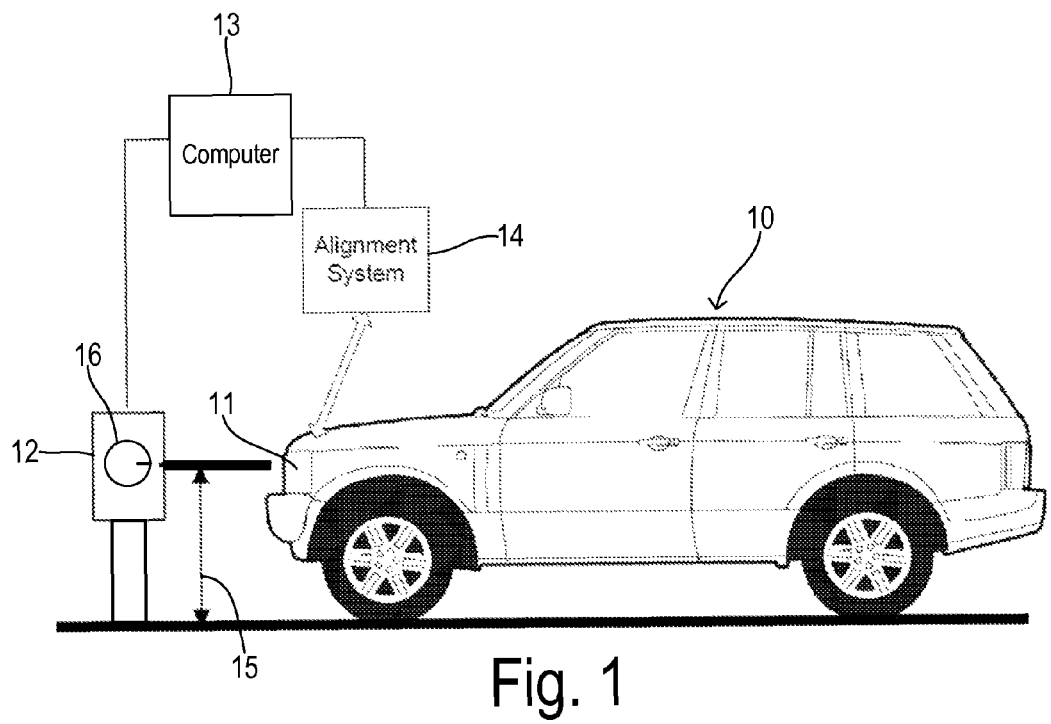
FIG. 1 shows a vehicle and headlamp aiming system.

Referring to FIG. 1, a vehicle 10 has a headlamp 11 that projects a light beam into an aimer 12. Aimer 12 is connected to a computer 13, which in turn controls an alignment system 14 mechanically coupled to headlamp 11 for adjusting a cutoff height 15. Aimer 12 accepts a headlight beam as an input to an optical system 16 for measuring cutoff height 15. A commercially available aimer can be used such as the Hoppy® Vision 100 optical headlamp aimer available from Wall Industries, LLC, of Emporia, Kans., or headlamp aiming systems available from Fori Automation Inc., of Shelby Township, Mich.

Figure 2:
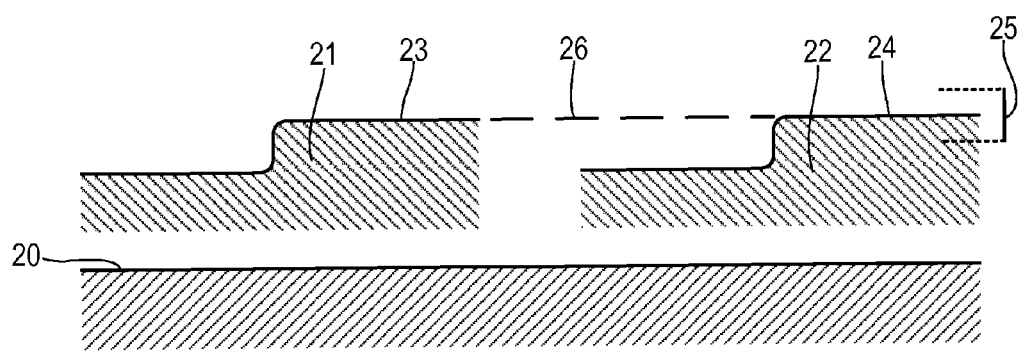
FIG. 2 shows desired cutoff heights for left-side and right-side headlamps.

FIG. 2 shows a floor 20 providing a reference plane for measuring height of a left-hand headlamp beam pattern 21 and a right-hand headlamp beam pattern 22. Beam pattern 21 has an upper cutoff height along a line 23, while beam pattern 22 has an upper cutoff height along a line 24. A buy-off window 25 defines a range of heights that are acceptable for meeting a particular regulatory requirement for the aiming of the headlamps. Buy-off window 25 may be specified for either low-beam or high-beam settings and may vary depending upon a particular vehicle model or type. For maximum customer satisfaction, it is desirable that cutoff heights 23 and 24 are at substantially the same height as shown by line 26.

Figure 3:
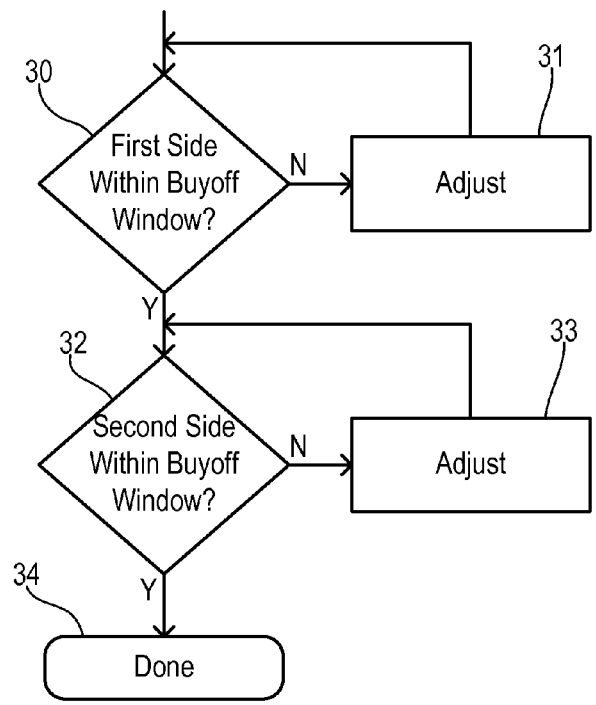
FIG. 3 is a flowchart showing a conventional method for aiming headlamps.

In a method of the prior art as shown in FIG. 3, a headlamp on a first side of a vehicle has its cutoff height measured. A determination is made in step 30 to determine if the cutoff height for the first side is within the predetermined buy-off window. If not, then a height adjustment is made in step 31 and the buy-off height is re-measured and re-compared to the buy-off window in step 30. In the adjustment performed in step 31, an automated adjustment may preferably be performed using a robotic adjuster. The adjuster has a minimum incremental height adjustment that can be executed based on the mechanisms and tolerances built into the adjuster. If the discrepancy from the buy-off window is a multiple of the minimum incremental height, then a command may be sent to the robotic adjuster that includes an adjustment that is a multiple of the minimum increment. If the remeasuring determines that the measured cutoff height is still not within the buy-off window, then an additional adjustment is made in step 31. Each successive adjustment should be smaller than the previous ones.

Once the first side cutoff height is within the buy-off window, the aimer equipment is moved or otherwise reconfigured to perform measurements for a headlamp on a second side of the vehicle. In step 32, the cutoff height is measured and a check is made to determine whether it is within the buy-off window. In this prior art method, the buy-off window employed in both steps 30 and 32 is comprised of a fixed range between a first fixed minimum height and a second fixed maximum height. If not within the buy-off window, then an adjustment is made in step 33 and the cutoff height is again measured in step 32. Once the cutoff height for the second side is within the buy-off window, the aiming process ends at step 34.

Figure 4:
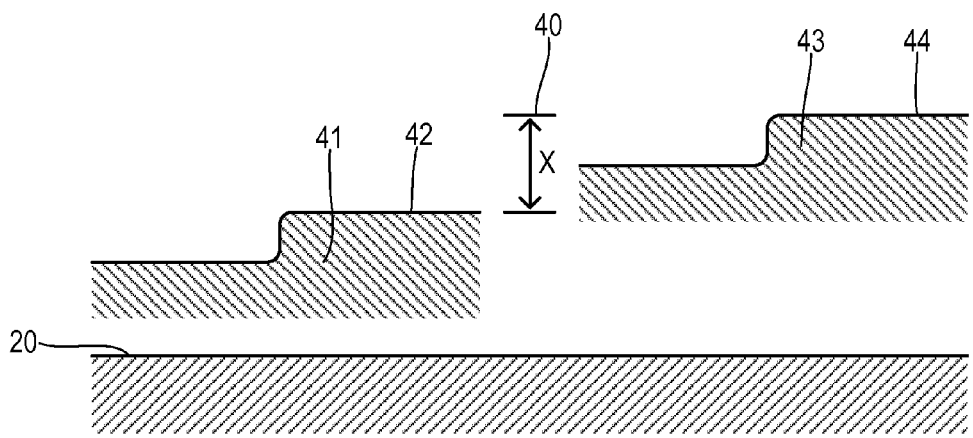
FIG. 4 shows a potential difference in cutoff heights using the conventional method.

As shown in FIG. 4, a buy-off window 40 as used in the prior art has a fixed size X and is located at a fixed height above ground 20. Since the two headlamps are aimed independently, a first beam pattern 41 may be adjusted so that its cutoff height 42 ends up with a value that coincides with the lower end of buy-off window 40 while a second beam pattern 43 is adjusted so that its cutoff height 44 ends up with a value that coincides with the upper end of buy-off window 40. Thus, the difference in cutoff heights between a left-side beam pattern and a right-side beam pattern can in its worst case be substantially equal to the size X of buy-off window 40. As previously explained, the use of a smaller buy-off window size X could reduce the difference, but is undesirable in terms of cost and the time consumed in the aiming process. Therefore, it would be desirable to reduce the worst case difference without unnecessary reduction in the size of X.

Figure 5:
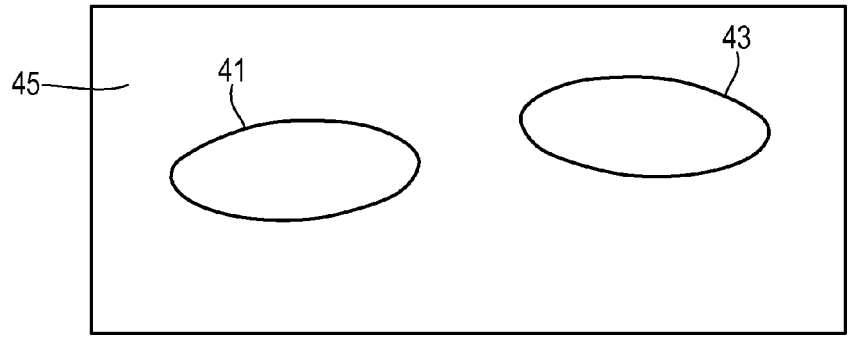
FIG. 5 shows the observable difference between beam patterns using the conventional method.

FIG. 5 shows left and right beam patterns 41 and 43 as they may be projected onto a vertical surface such as a wall or garage door 45. It is readily apparent how small differences in cutoff height could be easily observable to an occupant in the vehicle.

Figure 6:
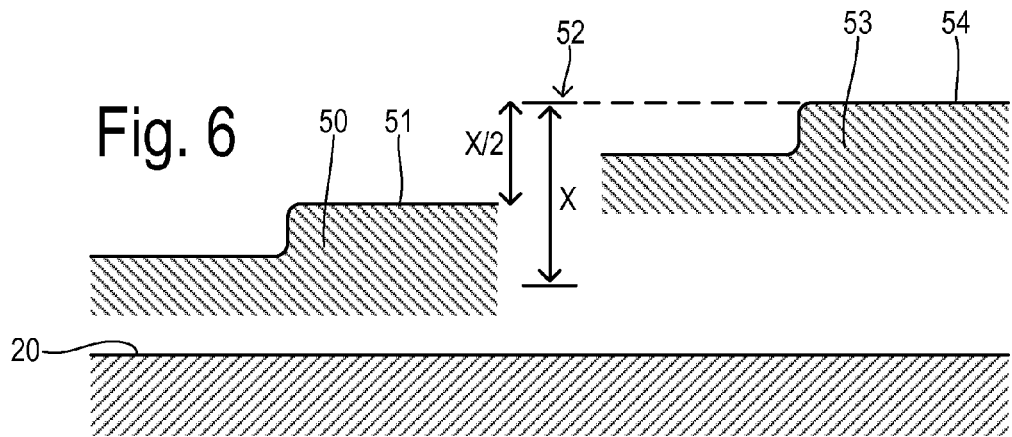
FIG. 6 shows the use of a dynamic buy-off window according to one preferred embodiment of the invention.

FIG. 6 depicts a dynamic buyoff-off window as used by the present invention which can cut in half the worst case differences between cutoff heights in beam patterns, thereby avoiding the situation shown in FIG. 5. Thus, a first-side headlamp has a beam pattern 50. The first headlamp is adjusted using the conventional fixed buy-off window in order to achieve a final cutoff height at line 51. After the aimer equipment is moved to measure and adjust the second-side headlamp, the second headlamp is adjusted using a dynamic buy-off window 52 with the same fixed size X but with a potentially different height above ground 20. More particularly, buy-off window 52 is centered on the final cutoff height 51 of the first beam pattern. Thus, buy-off window 52 has an upper bound substantially equal to cutoff height 51 plus one-half of X and a lower bound of cutoff height 51 minus one-half of X. The second-side beam pattern 53 is adjusted such that it achieves a cutoff height 54 within dynamic buy-off window 52. In this instance, however, the worst case difference is reduced to one-half of X event though the same equipment tolerances are being used.

Figure 7:
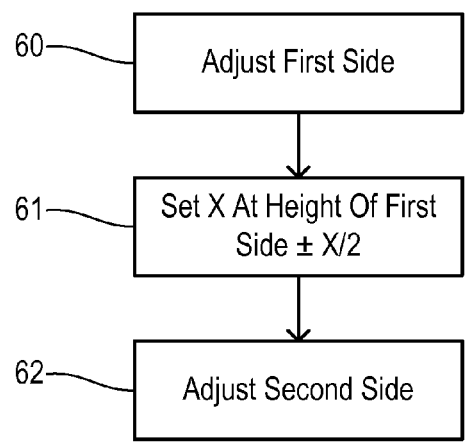
FIG. 7 is a flowchart showing an improved method of the present invention.

FIG. 7 illustrates the basic method. In step 60, a first-side headlamp is adjusted to a fixed buy-off window which may be centered on a predetermined fixed height. For the second-side headlamp, the predetermined height range for the buy-off window X is set at the final adjusted height of the first-side cutoff plus or minus one-half of X. Using the dynamic buy-off window, the second-side headlamp is adjusted in step 62.

Figure 8:
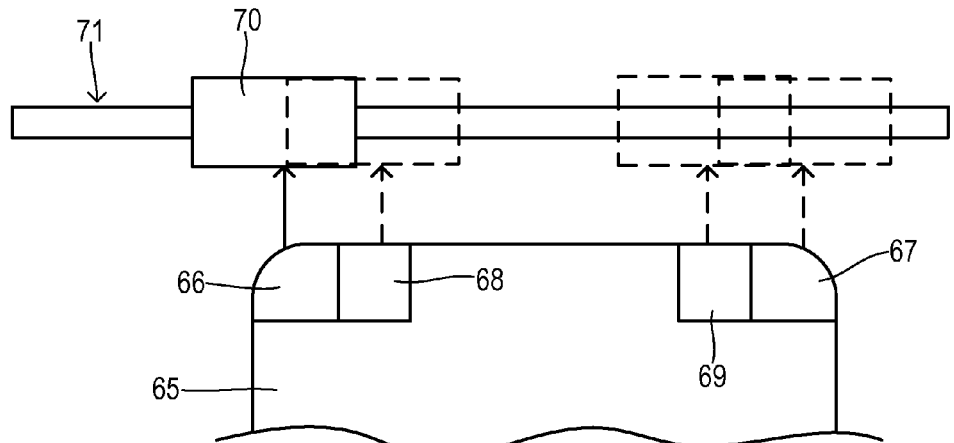
FIG. 8 is a top view of an aimer system.

FIG. 8 shows a top view of a vehicle 65 with a left-side high-beam headlamp 66 and a right-side high-beam headlamp 67. Separately provided are a left-side low-beam headlamp 68 and a right-side low-beam headlamp 69. An aimer 70 is mounted on a fixed rail system 71 for properly orienting aimer 70 with respect to each headlamp when needed. Thus, aimer 70 is shown in a position to measure a cutoff height of headlamp 66. Corresponding positions for aimer 70 are shown in dashed lines for measuring cutoff heights for headlamps 67-69. Rail system 71 is comprised of any commercially available system for moving aimer 70 in a fast and accurate manner to facilitate aiming of multiple headlamps.

Figure 9:
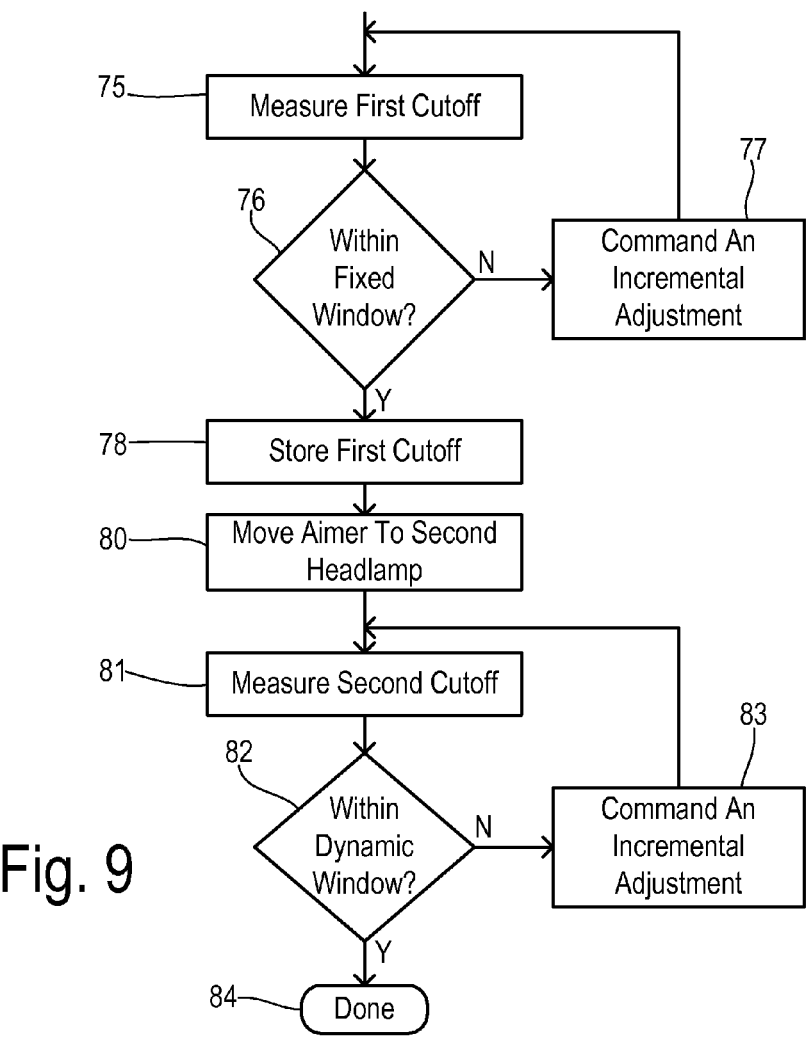
FIG. 9 is a flowchart showing a method of the invention in greater detail.

FIG. 9 shows a method in greater detail as can be performed for each pair of headlamps 66-67 and 68-69. After positioning the aimer in front of a first headlamp, a first cutoff height is measured in step 75. The measured first cutoff height is compared with the fixed buy-off window, and if not within the fixed window then an incremental adjustment is commanded in step 77 and the first cutoff height is re-measured in step 75. If falling within the fixed buy-off window, then the first cutoff height is stored in step 78. For example, the first cutoff height can be stored in the computer shown in FIG. 1.

In step 80, the aimer is moved to a second headlamp that is paired with the first headlamp and is on the opposite side of the vehicle. The second cutoff height is measured in step 81. The second cutoff height is compared with the dynamic buy-off window in step 82 that has been defined to be centered on the first cutoff height, and if not within the dynamic buy-off window then an incremental adjustment is commanded in step 83. Once the adjusted second cutoff height falls within the dynamic buy-off window in step 82, then the adjustment process is ended at step 84 (at least for that pair of headlamps). If a further pair of headlamps is present on the vehicle, then the method of FIG. 9 is repeated for the additional pair of headlamps. Alternatively, both high-beam and low-beam headlamps on one side of the vehicle could be aimed using respective fixed buy-off windows and then the headlamps on the opposite side of the vehicle could be aimed with dynamic buy-off windows set according to the corresponding cutoff heights determined for the first side of the vehicle. For each pair of headlamps, the buy-off window sizes can be similar to conventional systems while the variation in side-to-side cutoff heights are reduced to one-half or less of the worst case for the prior art.

What is claimed is:

1. A method of aiming headlamps on a vehicle, comprising the steps of:
   measuring a cutoff height of a first headlamp;
   adjusting the first headlamp until a measured first headlamp cutoff height is within a buy-off range centered on a predetermined fixed height;
   measuring a cutoff height of a second headlamp;
   adjusting the second headlamp until a measured second headlamp cutoff height is within a dynamic range centered on the first headlamp adjusted cutoff height.

2. The method of claim 1 wherein the first and second headlamps are each on a respective one of the left and right sides of the vehicle.

3. The method of claim 1 wherein the adjusting steps are each comprised of a series of incremental adjustments made by a robotic adjuster.

4. The method of claim 1 wherein an automatic aimer system is configured to 1) perform the measuring and adjusting steps for the first headlamp, 2) store the measured first headlamp cutoff height, 3) move from the first headlamp to the second headlamp on a movable support system, and 4) perform the measuring and adjusting steps for the second headlamp.

5. A headlamp aiming system for aiming first and second headlamps of a vehicle, comprising:
   an aimer for receiving illumination produced by the first and second headlamps to measure first and second headlamp cutoff heights, respectively;
   a computer for receiving the first and second headlamp cutoff heights from the aimer; and
   an adjuster for operatively coupling to the vehicle for executing adjustments of the first and second headlamps to incrementally modify the first and second headlamp cutoff heights in response to commands from the computer;
   wherein the computer is programmed to perform the steps of:
   a) measuring the first headlamp cutoff height;
   b) comparing the first headlamp cutoff height to a buy-off window, wherein the buy-off window is a predetermined range centered on a predetermined fixed height;
   c) if the first headlamp cutoff height is outside the buy-off window, then commanding an incremental adjustment of the first headlamp in a direction to move the first headlamp cutoff height toward the buy-off window and then returning to step a;
   d) if the first headlamp cutoff height is within the buy-off window, then storing the first headlamp cutoff height;
   e) measuring the second headlamp cutoff height;
   f) comparing the second headlamp cutoff height to a dynamic window, wherein the dynamic window is centered on the stored first headlamp cutoff height, wherein the size range of the dynamic window is the same size range as the buy-off window, and wherein the height of the dynamic window is non-identical to the buy-off window;
   g) if the second headlamp cutoff height is outside the dynamic window, then commanding an incremental adjustment of the second headlamp in a direction to move the second headlamp cutoff height toward the dynamic window and then returning to step e;
   h) if the second headlamp cutoff height is within the dynamic window then ceasing adjustment of the second cutoff height.

6. The system of claim 5 wherein the adjuster is a robotic alignment system for automatically executing the adjustments in response to the commands.

* * * * *